R. C. KIVLEY
June 13, 1933. BRAIDING MACHINE Re. 18,869
2 Sheets-Sheet 1
Original Filed July 27, 1927
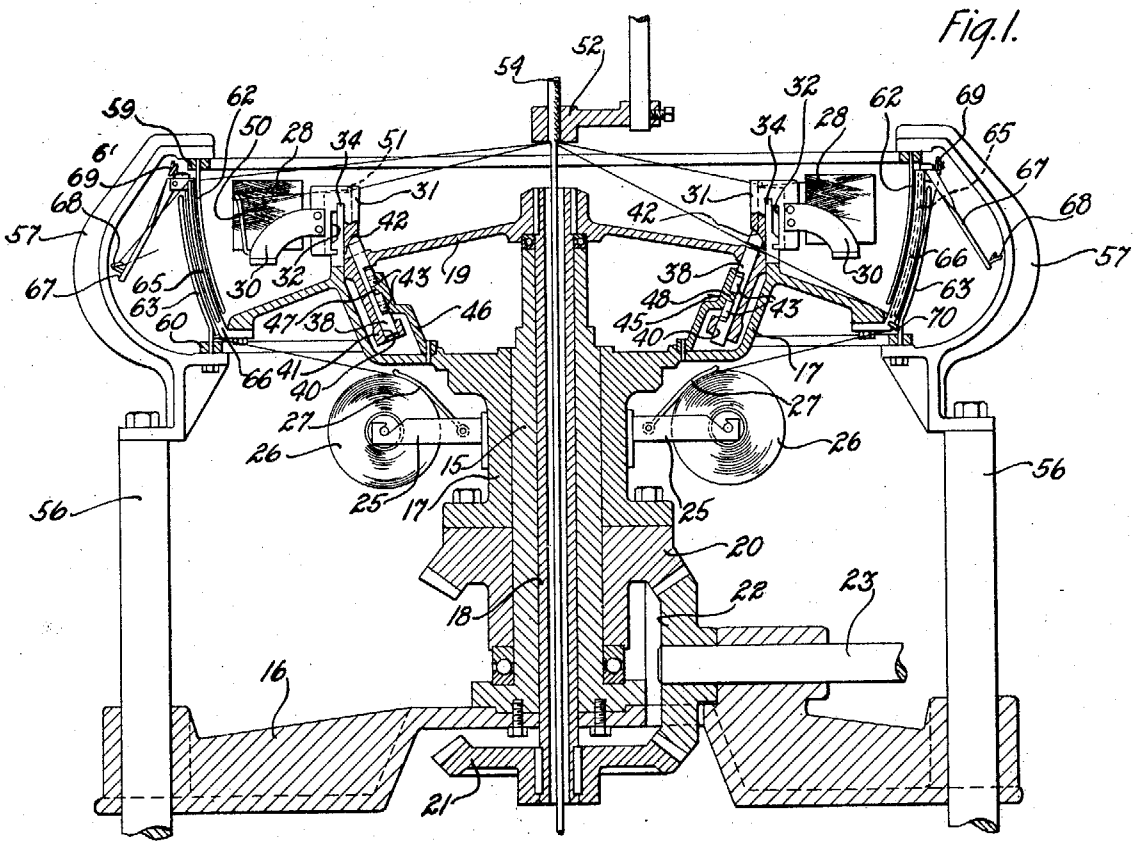
Inventor
Ray C. Kivley
By H. Hathaway Atty.

R. C. KIVLEY
June 13, 1933. BRAIDING MACHINE Re. 18,869
2 Sheets-Sheet 2
Original Filed July 27, 1927
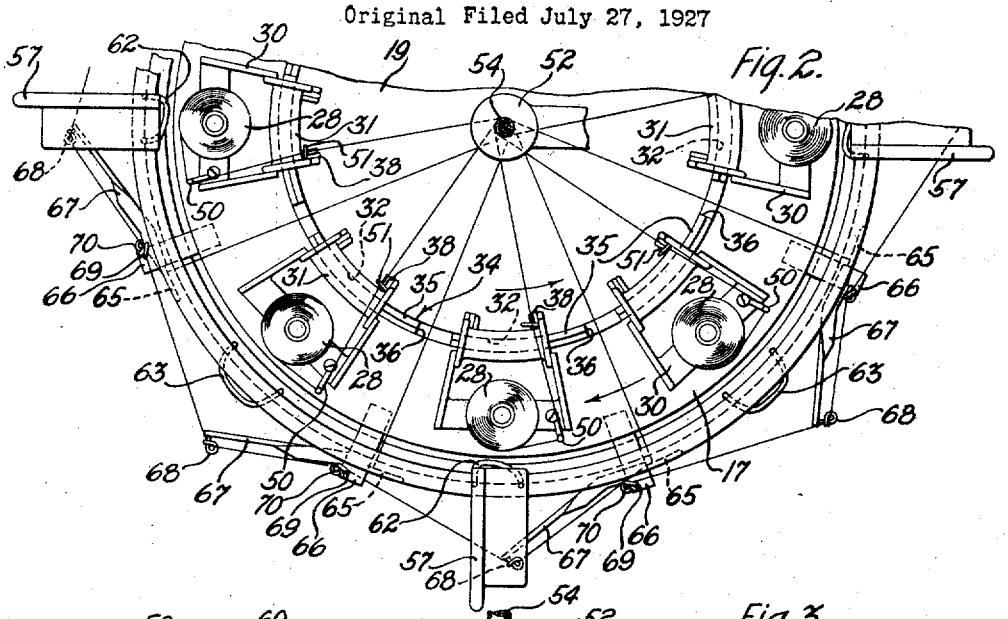
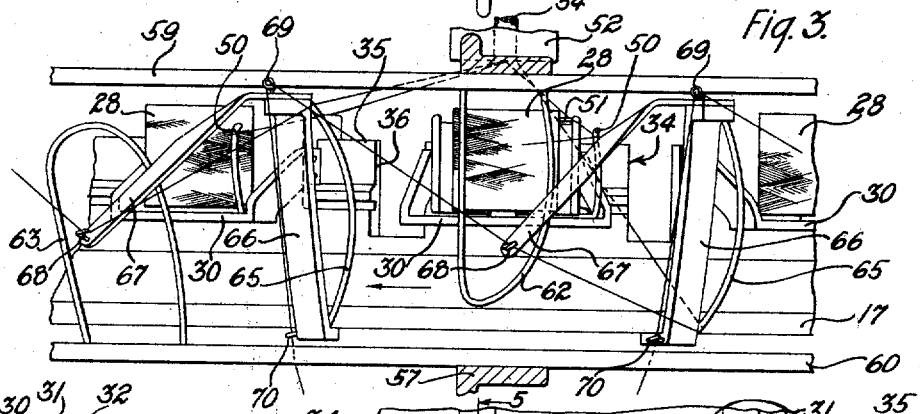
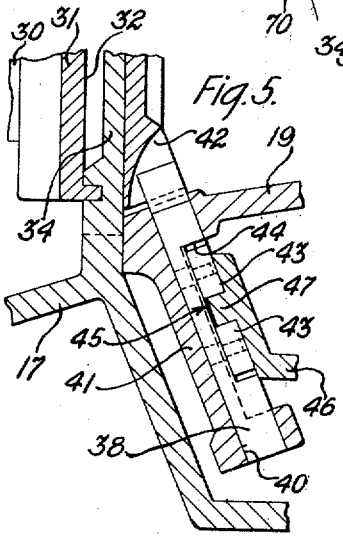
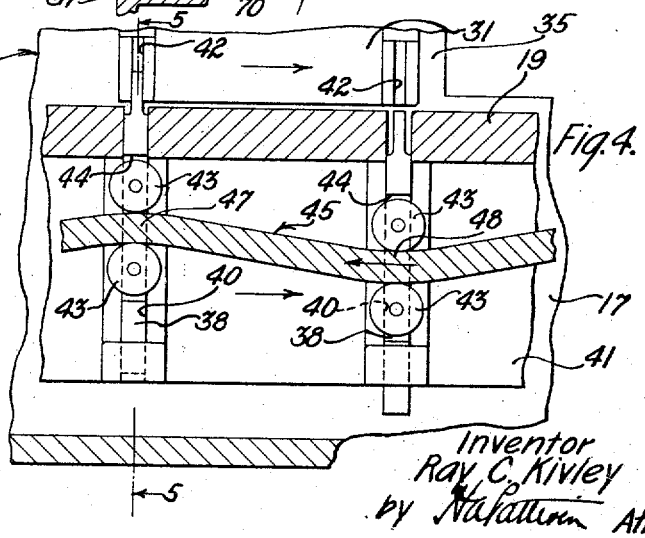
Inventor
Ray C. Kivley
by N. Patterson Att'y.

Reissued June 13, 1933 Re. 18,869

UNITED STATES PATENT OFFICE

RAY CHARLES KIVLEY, OF OAK PARK, ILLINOIS, ASSIGNOR TO WESTERN ELECTRIC COMPANY, INCORPORATED, OF NEW YORK, N. Y., A CORPORATION OF NEW YORK

BRAIDING MACHINE

Original No. 1,752,437, dated April 1, 1930, Serial No. 208,673, filed July 27, 1927. Application for reissue filed March 11, 1932. Serial No. 598,263.

This invention relates to braiding machines, and more particularly to braiding machines in which the strand supplies are arranged in sets and revolved in opposite directions about a common axis.

The principal objects of the present invention are the provision in braiding machines of the above mentioned type of durable and efficient mechanism for driving the strand supplies whereby such machines may be driven at a high rate of speed with a minimum amount of vibration and improved means for deflecting the strands from one set of supplies in and out around the supplies of the other set whereby the strands are constantly maintained under a uniform tension and are not subjected to deleterious strains.

In accordance with the general features of the invention there is provided in one embodiment thereof an improved braiding machine of the above mentioned type having the usual upper and lower strand supplies. The upper strand supplies are mounted upon individual carriers which are rotated in a direction opposite to that of the lower strand supplies by means of reciprocating driving members carried by a rotating turret. Each carrier is provided with a pair of reciprocating driving members arranged to be alternately engaged therewith and disengaged therefrom. The driving members are actuated by a continuous cam, the opposite faces of which are closely engaged by a pair of rollers carried by each of the driving members whereby the vibration of the moving parts is reduced to a minimum. The strands from the lower supplies are deflected in and out around the upper strand supplies by cooperating guide members which are designed to maintain a substantially uniform tension upon the strands.

Other features and advantages of the invention will become apparent from the following detailed description, reference being had to the accompanying drawings, wherein Fig. 1 is a fragmentary vertical section of a braiding machine embodying the features of the invention;

Fig. 2 is a semi-diagrammatic plan view of a portion thereof;

Fig. 3 is an enlarged developed front elevation of the structure shown in Fig. 2;

Fig. 4 is an enlarged fragmentary developed section, illustrating the improved mechanism for driving the upper strand supply carriers, and Fig. 5 is a fragmentary detail section taken on line 5—5 of Fig. 4.

Referring now to the drawings in detail and particularly to Fig. 1 thereof, the supporting framework of the apparatus comprises a vertically disposed tubular post 15 having a spider-like base 16 by means of which it may be secured to or supported upon a bench, table or pedestal (not shown). Rotatable about the tubular post 15 is an outer turret 17 and rotatably journaled within the post 15 is a hollow shaft or spindle 18 to the upper end of which is secured an inner turret 19. The turrets 17 and 19 are rotated in opposite directions by bevel gears 20 and 21 respectively, which in turn are driven by a bevel pinion 22 secured to a horizontally disposed drive shaft 23. The shaft 23 is journaled in suitable bearings formed in the framework and may be driven from any suitable source of power (not shown).

It is to be understood that the structure thus far described represents only one of the various types of braiding machines in which the features of the present invention may be advantageously employed. The invention is therefore not limited to the specific construction and arrangement shown but may assume various other forms in accordance with the particular type of braiding machine in which it is embodied.

Mounted upon the outer turret 17 and projecting radially therefrom are a plurality of brackets 25—25 which support the lower strand supplies 26—26. Suitable tension devices 27—27 are employed for controlling the delivery of the strands from the individual supplies but these are not here shown in detail since they form no part of the present invention. A plurality of upper strand supplies 28—28 are arranged above the lower strand supplies 26 with their axes at right angles to those of the lower strand supplies.

The upper strand supplies 28 are mounted upon individual U-shaped brackets 30—30 which are secured to individual carriers 31—31. The carriers 31 are provided with arcuate grooves 32 by means of which they are slidable upon an annular track 34 formed integral with or rigidly secured to the outer turret 17. It will be observed (Fig. 2) that the track 34 is divided into sections 35—35 and slots or openings 36—36 are provided between the individual sections through which the strands from the lower supplies are allowed to pass in and out around the upper strand supplies. The number of track sections 35 corresponds to the number of upper and lower strand supplies and when the upper strand supplies are in the positions illustrated in Fig. 2, the openings between the track sections register with the spaces between the ends of the carriers 31. The carriers are caused to revolve about the axis of the machine in the direction opposite to that of the lower strand supplies, and slide along the track 34, passing from one section to another across the openings therebetween. The carriers 31 are positively advanced along the track 34 by reciprocating driving members 38—38 carried by the inner turret 19.

In accordance with a feature of the present invention, improved mechanism is provided for imparting a reciprocatory movement to the driving members 38 whereby they are alternately engaged with and disengaged from the carriers 31 so as to allow the strands from the lower supplies to pass therebetween. As best shown in Fig. 4, two driving members 38 are provided for each carrier, each driving member being reciprocably mounted in a vertical guideway 40 formed in a frusto-conical rim portion 41 of the inner turret 19. The upper ends of the driving members 38 are adapted to engage with slots 42 formed in the carriers 31. Carried in a recess 44 upon the inner side of each of the driving members 38 are a pair of spaced rollers 43—43 which, during the rotation of the turret 19, ride upon opposite faces of a continuous cam 45 projecting from the outer surface of a frusto-conical sleeve 46 secured to the outer turret 17. As shown in Fig. 4, the cam 45 is composed of a plurality of alternating high and low portions 47 and 48, respectively, which act upon the rollers 43 to alternately project the driving members 38 into and withdraw them from engagement with the carriers 31. By employing two rollers for each driving member and spacing the rollers so that they closely engage opposite faces of the cam, it has been found that the wear upon the moving parts and the objectionable noises and vibration which are characteristic of machines of this type are reduced to a minimum, thus rendering it possible to run these machines at a much higher rate of speed. The arrangement of the driving members 38 with respect to the cam 45 is such that each carrier 31 is at all times engaged by one of its driving members and the driving members of each pair are alternately withdrawn from and returned into engagement with the carrier. By reason of this construction and arrangement, the strands from the lower supplies are allowed to pass by on the inside of the carriers 31, that is between the carriers and the turret 19, without obstruction by the driving members 38.

The strands from the upper supplies pass around and underneath suitable guide fingers 50 and 51 secured to the brackets 30 and carriers 31, respectively, and converge on the under side of an apertured guide member 52 (Fig. 1). The strands from the lower supplies also converge at this point and merge with the strands from the upper supplies to form a braid 54 which may be drawn from the machine by any suitable take-up device (not shown).

The improved mechanism for switching the strands from the lower supplies so as to deflect them in and out around the upper strand supplies to form the braid will now be described. Suitably supported on the base 16 are a plurality of vertical posts 56—56 upon the upper ends of each of which is mounted a bracket 57. Supported by the brackets 57 are a pair of annular supporting disks or rings 59 and 60 which are disposed in spaced relationship and in parallel horizontal planes. Secured to the supporting ring 59 and depending downwardly therefrom are a plurality of substantially U-shaped members 62—62. In the present embodiment of the invention four of these U-shaped members are provided and are equidistantly spaced around the supporting ring 59. Secured to the supporting ring 60 and extending upwardly therefrom are a plurality of inverted U-shaped members 63—63. As best shown in Fig. 2, the members 63 are positioned around the supporting ring 60 so that one of them is disposed intermediate each pair of adjacent members 62. It is obvious therefore that the number of inverted U-shaped members 63 will equal the number of U-shaped members 62. The strands from the lower supplies 26 pass between the U-shaped members 62 and 63 which are designed to deflect the lower supply strands in and out around the upper strand supplies.

Simple and efficient mechanism is provided for taking up the slack in the lower supply strands as they sinuate in and out around the upper strand supplies. This mechanism comprises a plurality of arcuate members 65—65 disposed in the path of the outer supply strands as best shown in Fig. 3. One of these arcuate members is provided for each lower strand and as shown in Fig. 3 each of the arcuate members is attached at each end to an individual bracket 66 carried by the outer turret 17. Extending downwardly and outwardly from the upper end of each bracket 66 is an arm 67 which is provided at its outer end with an eyelet 68. Similar eyelets 69 and 70 are carried upon the upper and lower ends, respectively, of the brackets 66. The eyelets 68, 69 and 70 serve to guide the strands from the lower supplies in the manner hereinafter described.

The operation of the improved braiding machine is as follows: The strands from the upper supplies 28 pass around the fingers 51 to the braiding point on the underside of the apertured guide member 52. The strands from the lower supplies 26 pass under the tension devices 27 through the eyelets 70 and 69 of the associated bracket 66, through the eyelet 68 of the arm 67 carried by the next adjacent bracket 66, and then around the arcuate member 65 of the latter bracket to the braiding point. When power is applied to the shaft 23, the turrets 17 and 19 are rotated in opposite directions as indicated by the arrows in Fig. 2. The upper strand supply carriers 31 are driven along the track in the direction of the turret 19 through the driving members 38 while the track 34 is rotated in the opposite direction with the turret 17. The turret 17 also carries the lower strand supplies 26 and the arcuate members 65, the latter passing between the stationary U-shaped members 62 and 63. Thus, it will be understood that the arcuate members 65 pass the upper strand supply carriers 31 during their revolution in the opposite direction thereto. The strands from the lower supplies are carried about the axis of the machine and are deflected in and out around the upper strand supplies by the U-shaped members 62 and 63 as hereinbefore described. The U-shaped members 62 and 63 and the curvature of the arcuate members 65 are so designed that the length of strand between the lower supplies and the braiding point remains constant at all times. Thus, a uniform tension is maintained in the lower supply strands without the use of delicate tension controlling devices as have heretofore been employed. This materially decreases the number of moving parts which obviously decreases vibration as well as the initial and operating costs of the machine.

Referring particularly to Fig. 3, it will be understood that the lower supply strands upon coming in contact with the U-shaped members 62 will be deflected downwardly along the arcuate members 65 and the curved right hand leg of the U-shaped members 62. As the lower supply strands are carried around the bottom of the members 62, they pass underneath the upper strand supply carriers 38 which are passing by the U-shaped members 62 in the opposite direction. As the lower supply strands pass underneath the carriers 31 the driving members 38 are alternately withdrawn from engagement with the carriers, this action taking place through the operation of the cam 45 in such manner that the movement of the strands is unobstructed as hereinbefore described. After passing around the U-shaped members 62 the lower supply strands are deflected upwardly by the inverted U-shaped members 63 whereby they are caused to pass over the top of the next upper strand supply carriers 31. In this way the lower supply strands are passed over and under the upper supply strands to form the braid.

In the machine herein illustrated and described, eight upper and lower strand supplies are provided and four U-shaped members 62 and the same number of inverted U-shaped members 63 are arranged in series about the axis of the machine. Thus, since the members 62 and 63 remain stationary while the carriers 31 and the arcuate members 65 are rotating in opposite directions at equal rates of speed it will be obvious that the lower supply strands will pass under two upper strand supply carriers and then over the next two carriers and so on throughout the operation of the machine. Of course, the construction and arrangement of the members 62 and 63 may be changed so as to produce any desired result. For instance, by doubling the number of members 62 and 63 and arranging them closer together, the lower strands may be caused to pass over one and under one of the upper strands.

Although one specific embodiment of the invention has been herein illustrated and described, it is to be understood that the novel features of the invention are capable of various other applications within the scope of the appended claims.

What is claimed is:

1. In a braiding machine, a plurality of sets of strand supplies rotating in opposite directions about a common axis, and a plurality of stationary U-shaped and inverted U-shaped members arranged in series about said axis for deflecting the supply strands of one of the sets in and out around the strand supplies of another set.

2. In a braiding machine, a plurality of strand supplies rotating in opposite directions about a common axis, a plurality of stationary U-shaped and inverted U-shaped members arranged in series around said axis for shifting the strands of the supplies rotating in one direction in and out around the strand supplies rotating in the opposite direction, and an arcuate member associated with each of the shifted supply strands for maintaining a uniform tension therein.

3. In a braiding machine, a rotating member, a plurality of strand supplies arranged around the rotating axis of the member, a pair of driving members associated with each strand supply and carried by the rotating member for revolving said supplies in the direction of rotation of the member, means for alternately engaging the driving members of each pair with the associated strand supply, and an arcuate member associated with each strand supply for maintaining a uniform tension therein.

4. In a braiding machine, a moving member, a plurality of strand supplies supported thereby, a second member moving in a direction opposite to the first member, a pair of driving members carried by the second moving member for moving one of the strand supplies therewith, means comprising a cam projecting from the surface of the first moving member and rollers carried by the driving members engaging opposite faces of the cam for alternately engaging the driving members with said strand supply, a plurality of alternating U-shaped and inverted U-shaped members for shifting the strand from another of the supplies in and out around said strand supply, and an arcuate member for maintaining the shifted strand under a uniform tension.

5. In a braiding machine, a plurality of sets of strand supplies rotating in opposite directions about a common braiding point, means for shifting the strands of one of the sets in and out around the strand supplies of another set, and a guide member mounted in fixed relation to each of the shifted strands for maintaining a constant length at all times of said shifted strands between the supplies and the common braiding point.

6. In a braiding machine, a plurality of sets of strand supplies rotating in opposite directions about a common axis, a plurality of stationary U-shaped and inverted U-shaped members arranged in series about said axis for deflecting the strands of one of the sets in and out around the strand supplies of another set, and arcuate members for maintaining a constant length of deflected strands between said supplies and said braiding point.

In witness whereof, I hereunto subscribe my name this 24 day of February, 1932.

RAY CHARLES KIVLEY.